R. LEONARD.
HORSE-POWER.

No. 175,118. Patented March 21, 1876.

WITNESSES
Henry N. Miller
C. L. Evert

INVENTOR
R. Leonard.
By Alexander T. Mason
Attorneys.

UNITED STATES PATENT OFFICE.

REUBEN LEONARD, OF OAKLAND MILLS, PENNSYLVANIA.

IMPROVEMENT IN HORSE-POWERS.

Specification forming part of Letters Patent No. 175,118, dated March 21, 1876; application filed February 10, 1876.

*To all whom it may concern:*

Be it known that I, REUBEN LEONARD, of Oakland Mills, in the county of Juniata and in the State of Pennsylvania, have invented certain new and useful Improvements in Horse-Powers; and do hereby declare that the following is a full, clear, and exact description thereof, reference being had to the accompanying drawings, and to the letters of reference marked thereon, making a part of this specification.

The nature of my invention consists in the construction and arrangement of the several parts of a horse-power in the manner hereinafter more particularly set forth.

Figure 1:
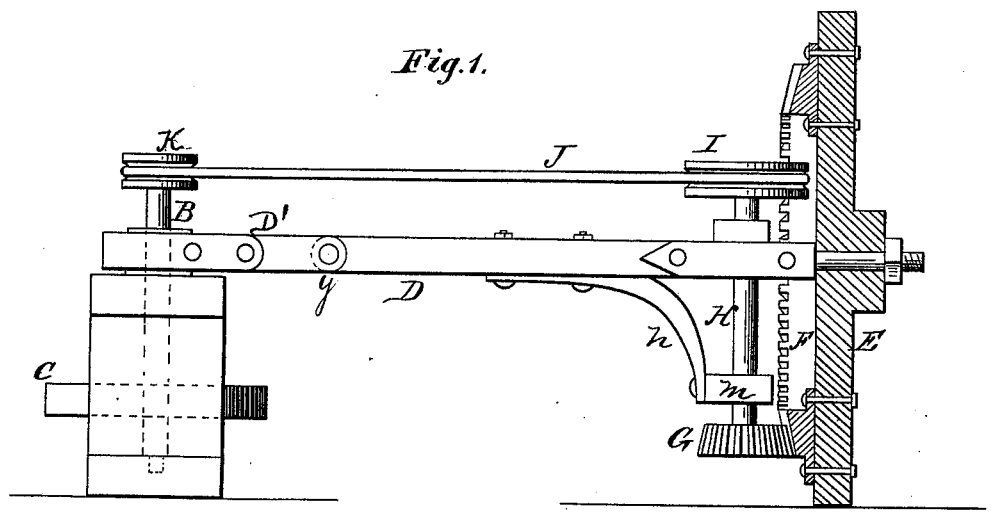
Figure 2:
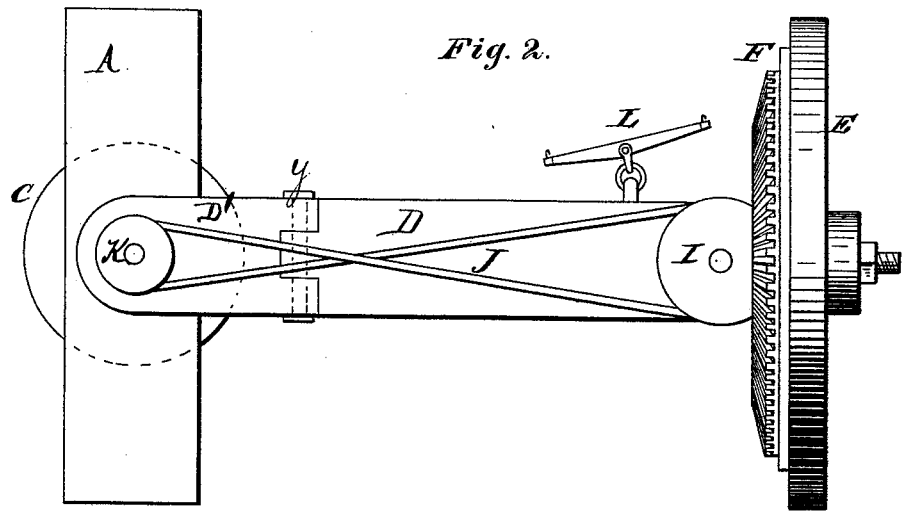

In the accompanying drawings, Figure 1 represents a side view, and Fig. 2 a plan view, of my horse-power.

In the figures, A represents a frame, which is made stationary, upon or in the ground, in any suitable manner. This frame contains a vertical shaft, B, upon the upper end of which is a pulley, K, and upon and near the lower end of which is a band or driving-wheel, C. D D' represent the sweep, which is made in two parts, connected together by a bolt or pivot, *y*, with the part D' fitting loosely over the upright shaft B. Upon the outer end of this sweep is a large wheel, E, working upon a suitable journal or arm on it. This wheel E either has cast upon it suitable cog-gearing or has bolted to its inner face a separate wheel, F, which has gear-teeth formed upon it. H represents a vertical shaft, which passes through and has one bearing in the sweep. Upon the upper end of this shaft is a pulley, I, and upon the lower end is a gear-wheel, G, the teeth of which engage with the teeth upon the wheel F. *m* represents a bearing-block for the shaft H near its lower end, and *n* represents a brace for this block, to keep it securely in place. J represents a band, which connects the two pulleys I and K, and which transmits power and motion to the shaft B and wheel C.

In operating this machine, the frame A being stationary, the horse is hitched to the sweep near the large wheel E, as seen at L. When the horse moves the sweep makes a circular movement, the wheel E resting upon the ground or a suitable track. This wheel E is made heavy enough, so that when it revolves it will communicate motion and power to wheel G, and this wheel, through its pulley I and band J, gives motion and power to the shaft B. The machinery to be driven is connected to this power by a belt which passes around driving-wheel C.

The parts of the sweep which are pivoted together are made rounding, as shown in Fig. 1, and the sweep, by being made in two parts and hinged together, will allow the wheel E to pass over any uneven ground without the inner end of the sweep rising and binding on the shaft.

I do not broadly claim a horse-power in which a large hollowed-out traveling gear-wheel is used in combination with a hinged sweep and a pinion connected to a shaft, which communicates power to a shaft through the medium of additional gears near the power-shaft, as I am aware that such is not new.

Having thus fully described my invention, what I claim as new, and desire to secure by Letters Patent, is—

In combination with the large wheel E, with beveled gear on its inner face, and the hinged sweep D D', the vertical shaft H, having gear-wheel G at its bottom, and braced to the sweep by the bearing-block *m* and bar *n*, the pulley I, belt J, and pulley K on the upright shaft in the frame A, all constructed substantially as and for the purposes herein set forth.

In testimony that I claim the foregoing I have hereunto set my hand this 20th day of January, 1876.

REUBEN LEONARD.

Witnesses:
H. A. HALL,
M. L. STOWELL.